(No Model.)
G. F. HOLMES.
DRIP PAN FOR REFRIGERATORS.
No. 255,290. Patented Mar. 21, 1882.
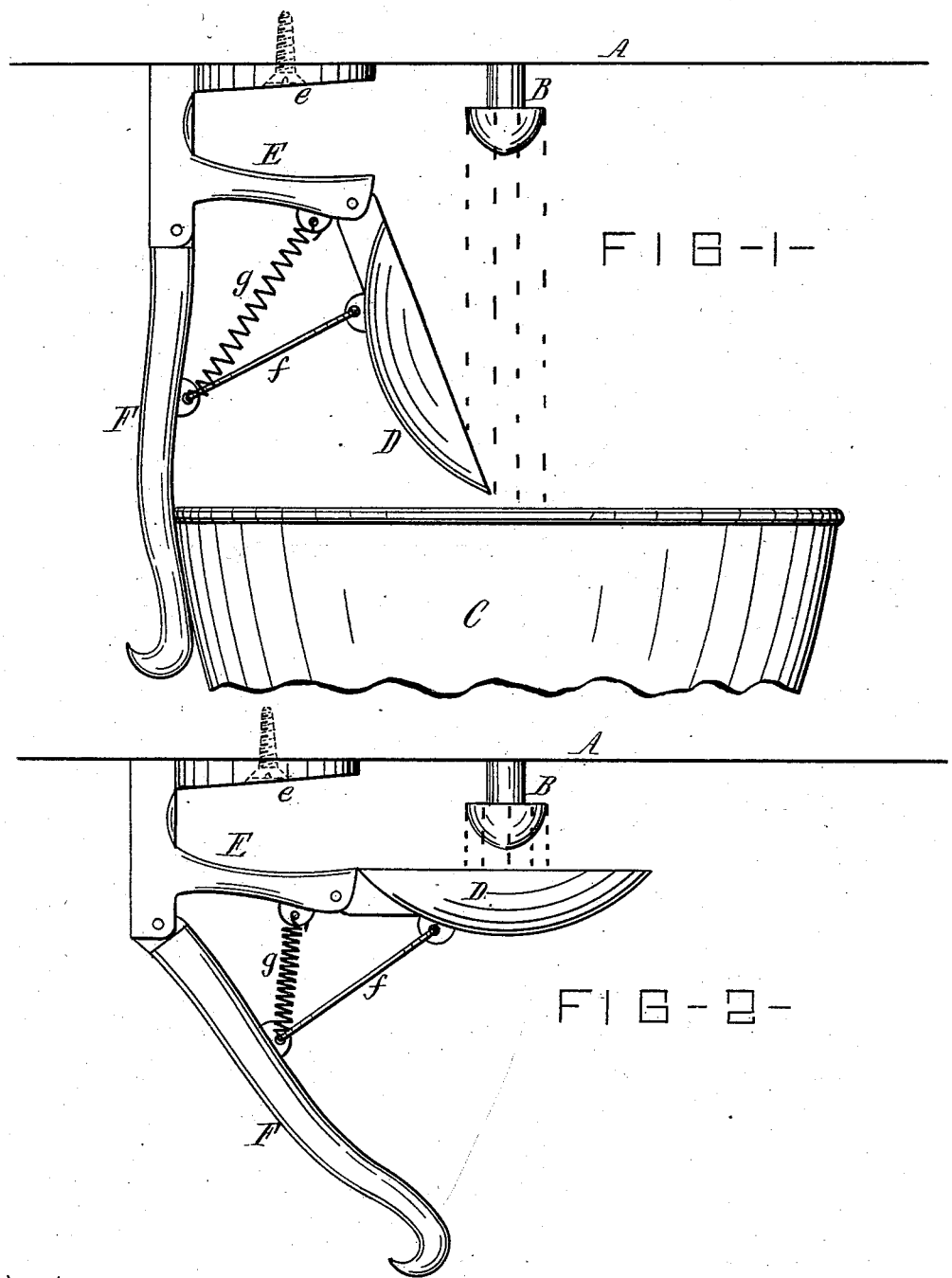

UNITED STATES PATENT OFFICE.

GEORGE F. HOLMES, OF SYRACUSE, NEW YORK.

DRIP-PAN FOR REFRIGERATORS.

SPECIFICATION forming part of Letters Patent No. 255,290, dated March 21, 1882.

Application filed December 20, 1881. (No model.)

*To all whom it may concern:*

Be it known that I, GEORGE F. HOLMES, of the city of Syracuse, in the county of Onondaga, in the State of New York, have invented a new and useful Improvement in Drip-Pans for Refrigerators, of which the following is a specification.

This invention relates more particularly to a device whereby the water is prevented from dripping on the floor from the waste-pipe of a refrigerator or ice-box when the vessel which is usually placed under such waste-pipe is removed for the purpose of being emptied.

My invention consists to that end of a movable drip-pan which is attached to the bottom of the refrigerator and adapted to receive the water dripping from the waste-pipe, and which is provided with means whereby it is swung out of the way when the vessel which receives the waste water is put in place, and automatically moved under the waste-pipe to receive the water dripping therefrom when said vessel is removed.

In the accompanying drawings, Figure 1 is a side elevation, showing my improved drip-pan in the position which it assumes when the vessel is placed under the waste-pipe. Fig. 2 is a similar view, showing the drip-pan in the position in which the vessel is removed and the pan receives the water.

Like letters of reference refer to like parts in both figures.

A represents the bottom of a refrigerator or ice-box, of any suitable construction.

B represents the waste-pipe, provided with the usual trap at its lower end.

C represents the vessel which is placed under the waste-pipe for the purpose of receiving the water which escapes therefrom.

D represents the drip-pan, which is pivoted to a bracket, E, secured at *e* to the bottom of the refrigerator or ice-box.

F represents a depending arm, pivoted with its upper end to the bracket E, and connected with the pan D by a rod, *f*, so that a movement of the arm F will cause a similar movement in the pan D.

*g* is a spiral or other suitable spring, whereby the arm F is connected with the bracket E in such manner that the pan D is thereby held in a horizontal position, as represented in Fig. 2. The hinge whereby the pan is attached to the bracket is preferably provided with a shoulder, which arrests the upward movement of the pan when the latter has reached a horizontal position. In this position of the pan the arm F projects forward in an inclined position, as shown in Fig. 2, and obstructs in this position part of the space which is occupied by the vessel C when the latter is in place. By pushing the latter under the waste-pipe the arm F is swung backward and the pan D downward, as represented in Fig. 1. In this position of the parts the water drips from the waste-pipe directly into the vessel C. Upon removing the latter the pan D is returned to its horizontal position by the spring *g*. The water now drips into the pan D, which is of sufficient capacity to hold the water which may escape from the waste-pipe during the time usually consumed in emptying and replacing the vessel C. The water is by this means prevented from dripping upon the floor under any circumstances.

My improved drip-pan is very simple in construction and can be produced at very small expense.

I claim as my invention—

1. In a refrigerator, the combination, with the water-discharge orifice, of a movable drip-pan, D, attached to the bottom of the refrigerator, a projection or arm whereby the pan is swung from under the discharge-orifice by the vessel which receives the waste water when said vessel is put in place, and retained in this position while said vessel remains in place, and means whereby the pan is automatically returned under the discharge-orifice to receive the water when said vessel is removed, substantially as set forth.

2. The combination, with a refrigerator having a water-discharge orifice, B, of a bracket, E, a drip-pan, D, and arm F, pivoted to said bracket, spring *g*, connecting the arm with the bracket, and a rod, *f*, connecting the arm with the drip-pan, substantially as set forth.

GEORGE F. HOLMES.

Witnesses:
LOUIS MARSHALL,
R. M. FRENCH.